United States Patent [19]

Siddall

[11] 3,709,915
[45] Jan. 9, 1973

[54] SESAMOLYL AND PIPERONYL ETHERS AND THIOETHERS

[75] Inventor: John B. Siddall, Palo Alto, Calif.

[73] Assignee: Zoecon Corporation, Palo Alto, Calif.

[22] Filed: Dec. 31, 1970

[21] Appl. No.: 103,278

[52] U.S. Cl. ............260/340.5, 260/410, 260/410.9, 260/456, 260/470, 260/473, 260/488, 424/282
[51] Int. Cl. .............................................C07d 13/10
[58] Field of Search....................................260/340.5

[56] References Cited

UNITED STATES PATENTS 3,563,982  2/1971  Bowers..........................260/340.5 X Primary Examiner—Alex Mazel
Assistant Examiner—James H. Turnipseed
Attorney—Donald W. Erickson

[57] ABSTRACT

Esters of phenyl ethers and phenyl thioethers useful for the control of insects.

8 Claims, No Drawings

SESAMOLYL AND PIPERONYL ETHERS AND THIOETHERS

This invention relates to novel compounds and the synthesis thereof useful for the control of insects. More particularly, the present invention relates to novel compounds of the following formulas I, II and III, the synthesis thereof, and the control of insects.

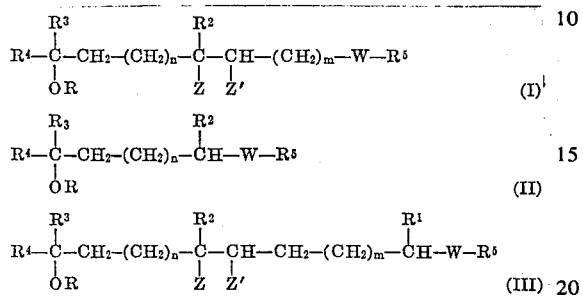

wherein, $m$ is the positive integer 1 or 2; $n$ is the positive integer 2 or 3; each of $Z$ and $Z'$ is hydrogen or taken together a carbon-carbon bond; each of $R^1$, $R^2$, $R^3$ and $R^4$ is lower alkyl; W is oxygen atom or sulfur atom; R is the residue of a carboxylic acid; $R^5$ is one of the groups

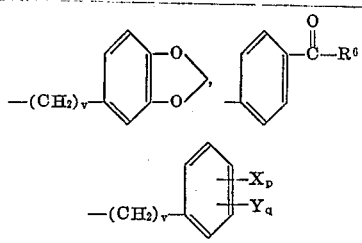

in which $v$ is zero or the positive integer 1; $R^6$ is hydrogen, lower alkyl, cycloalkyl, aralkyl or lower alkoxy; X is halo, Y is lower alkyl, lower alkenyl, lower alkoxy, nitro, cyano, halomethyl, dihalomethyl, trihalomethyl, lower alkylthio, lower alkylsulfinyl or lower alkylsulfonyl; $p$ is zero or a positive integer of 1 to 5; and $q$ is zero or a positive integer of 1 to 3, the sum of $p$ and $q$ being from 1 to 5.

The term "halo," as used herein, refers to bromo, chloro, fluoro or iodo. The term "lower alkyl," as used herein, refers to an alkyl group, straight or branched, having a chain length of one to six carbon atoms. The term "cycloalkyl," as used herein, refers to a cycloalkyl of three to eight carbon atoms. The term "aralkyl," as used herein, refers to aralkyl of seven to 12 carbon atoms, such as benzyl, phenethyl, methylbenzyl or naphthylmethyl. The term "lower alkoxy," as used herein, refers to lower alkoxy of one to six carbons, such as methoxy, ethoxy and propoxy.

The novel compounds of formulas I, II and III are useful for the control of insects. The utility of these compounds as insect control agents is believed to be attributable to their juvenile hormone activity. They are preferably applied to the immature insect, namely — during the embryo, larvae or pupae stage in view of their ability to inhibit metamorphosis and otherwise cause abnormal development. These compounds are effective control agents for Hemipteran, such as Lygaeidae, Miridae and Pyrrhocoridae; Coleopteran, such as Tenebrionidae; Lepidopteran, such as Pyralidae, Noctiidae and Gelechiidae; Dipteran, such as mosquitoes; Orthoptera, such as roaches; and Homoptera, such as aphids. The compounds can be applied at low dosage levels of the order of 0.001 $\mu$g. to 25 $\mu$g. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 50 percent of the active compound is employed. The formulation can include insect attractants, emulsifying agents and wetting agents to assist in the application and efficiency of the active ingredient.

The compounds of formulas I, II and III include lower alkyl and lower alkoxy substituted phenyl, i.e., wherein Y is lower alkyl or lower alkoxy, which are exemplified by 4-ethylphenyl, 3-ethyl-phenyl, 2-ethylphenyl, 3,5-dimethylphenyl, 3,4-dimethylphenyl, 2,6-dimethylphenyl, 2,5-dimethylphenyl, 2,4-dimethylphenyl, 2,3-dimethylphenyl, 2,6-dimethylphenyl diisopropylphenyl, 3,5-di-t-butylphenyl, 2,6-di-sec-butylphenyl, 2,5-di-t-butylphenyl, 2,4-di-t-butylphenyl, 2,6-di-t-butyl-4-methylphenyl, 4-t-butylphenyl, 3-t-butylphenyl, 4-sec-butylphenyl, 2-t-butylphenyl, 2-sec-butyl-phenyl, 4-t-butyl-2-methylphenyl, 2-t-butyl-6-methylphenyl, 2-t-butyl-5-methylphenyl, 2-t-butyl-4-methylphenyl, 4-t-amylphenyl, 2-isopropylphenyl, 3-isopropylphenyl, 2-n-propylphenyl, 4-n-propylphenyl, 2,3,5,6-tetramethylphenyl, 2,4,6-tri-t-butylphenyl, 2,3,5-trimethylphenyl, 2,3,6-trimethylphenyl, 2,4,6-trimethylphenyl, 3,4,5-trimethylphenyl, 4-isopropylphenyl, 2-methyl-4,6-dinitrophenyl, 2-methyl-4-chlorophenyl, 2-chloro-4-t-butylphenyl, 2-chloro-4,5-dimethylphenyl, 2,6-dimethyl-4-nitrosophenyl, 2,6-dimethyl-4-nitrophenyl, 2,4-dichloro-6-methylphenyl, 2,4-dichloro-5-methylphenyl, 2,6-di-t-butyl-4-nitrosophenyl, 2,6-dibromo-4-methylphenyl, 4-chloro-2,3,6-trimethylphenyl, 4-chloro-3-methyl-phenyl, 4-chloro-2-methylphenyl, 2-chloro-6-methylphenyl, 4-chloro-3,5-dimethylphenyl, 4-chloro-2,6-dimethylphenyl, 4-chloro-2,5-dimethylphenyl, 2-chloro-4,5-dimethylphenyl, 4-t-butyl-2-chlorophenyl, 2-bromo-4-methylphenyl, 4-bromo-3,5-dimethylphenyl, 2-bromo-4,5-dimethylphenyl, 2-methyl-3-nitrophenyl, 3-methyl-4-nitrophenyl, 4-methyl-3-nitrophenyl, 5-methyl-2-nitrophenyl, 2-methyl-4-nitrosophenyl, 3-methyl-4-nitrosophenyl and 2-methoxy- 4-methylphenyl and lower alkoxyphenyl, such as 3,5-dimethoxyphenyl, 2,6-dimethoxyphenyl, 2,3-dimethoxyphenyl, 4-n-butoxyphenyl, 4-methoxyphenyl, 4-ethoxyphenyl, 2-ethoxy-4-nitrophenyl, 2-methoxy-4-nitrophenyl, 2-methoxy-4-chlorophenyl and 3-methoxyphenyl.

Examples of other phenyl groups are 4-nitrosophenyl, 2-chloro-4-nitrosophenyl, 2-chloromethyl-4-nitrophenyl, 3-trifluoromethyl-2,4,6-trinitrophenyl, 4-cyanophenyl, 3-cyanophenyl, 2-cyanophenyl, 4-methylthiophenyl, 4-trifluoromethylphenyl, 3-trifluoromethylphenyl, 2,5-dichloro-4-methoxyphenyl, 2,6-dichloro-4-(methylsulfonyl)phenyl, 3,5-dichloro-4-

(methylsulfonyl)phenyl and 2,5-dichloro-4-methylthiophenyl.

Examples of other phenyl groups ($R^5$) of the compounds of the present invention are 2-chloro-4-bromophenyl, 2,3 or 4-chlorophenyl, 2,3-, 2,4-, 2,5-, 2,6-, 3,4- or 3,5-dichlorophenyl, 2,3,4-, 2,3,6-, 2,3,5-, 2,4,5-, 2,4,6- or 3,4,5-trichlorophenyl, pentachlorophenyl, pentabromophenyl, pentafluorophenyl, 2,3,4,6-tetrachlorophenyl, 2,3,5,6-tetrafluorophenyl, 2,4,6-tribromophenyl, 2,4,6-triiodophenyl, 4-bromo-2,6-dichlorophenyl, 4-iodophenyl, 2-, 2- or 4-fluorophenyl, 2-, 3- or 4-bromophenyl and 4-iodophenyl.

In the description following, each of R to $R^6$, $X_p$, $Y_q$, m, n, v, Z and Z′ is as defined above.

The compounds of formulas I, II and III are conveniently prepared from the precursors I′, II′ and III′:

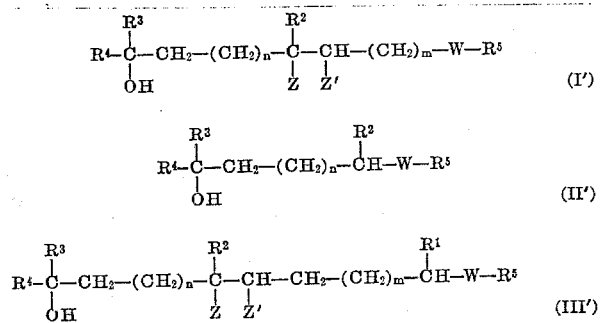

by reaction with a carboxylic acid chloride or bromide or carboxylic acid anhydride in pyridine or by treatment with a carboxylic acid anhydride in the presence of sodium acetate. The reaction is generally conducted at about room temperature to reflux temperature for about 1 to 48 hours, shorter reaction time being favored by temperatures above room temperature. The precursors I′, II′ and III′ are prepared by addition of water to the terminal olefinic bond using mercuric salt followed by reduction according to application Ser. No. 59,762, filed July 30, 1970; application Ser. No. 60,636, filed Aug. 3, 1970; and application Ser. No. 100,787, filed on Dec. 22, 1970 the disclosure of which is hereby incorporated by reference.

The term "the residue of a carboxylic acid," as used herein, refers to the carboxylic acyl group of —OR. The acyl group is determined by the particular carboxylic acid halide or carboxylic acid anhydride employed in the esterification of the hydroxyl precursor's I′, II′ and III′. Although no upper limitation need be placed on the number of carbon atoms contained in the acyl group within the scope of the present invention, generally it contains from one to 18 carbon atoms. Typical esters of the present invention include formate, acetate, propionate, enanthate, benzoate, trimethylacetate, trichloroacetate, trifluoroacetate, t-butylacetate, phenoxyacetate, cyclopentylpropionate, aminoacetate, β-chloropropionate, adamantoate, octadec-9-enoate, dichloroacetate, butyrate, pentanoate, hexanoate, phenylacetate, p-methylbenzoate, β-phenylpropionate, 3,4-dimethylbenzoate, p-isopropylbenzoate, cyclohexylacetate, stearate, methacrylate, p-chloromethylbenzoate, p-methoxybenzoate and p-nitrobenzoate.

The following examples are provided to illustrate the present invention. Temperature is given in degrees Centigrade.

EXAMPLE 1

A mixture of 1 g. of 1-(7′-hydroxy-3′,7′-dimethyloctanyloxy)-4-ethylbenzene (7-hydroxy-3,7-dimethyloctyl p-ethylphenyl ether), 10 ml. of acetic anhydride and 0.5 g. of dry sodium acetate is refluxed for about 5 hours. After cooling, excess anhydride is removed by vacuum and the residue extracted with ether. The ethereal extract is washed, dried over magnesium sulfate and evaporated to yield the corresponding acetate [1-(7′- acetoxy-3′,7′-dimethyloctanyloxy)-4-ethylbenzene].

The acetate of each of the hydroxyl compounds under Column I are prepared using the above procedure.

(I)

1-(7′-hydroxy-3′,7′-dimethyloct-2′-enyloxy)-4-ethylbenzene,
1-(7′-hydroxy-3′,7′-dimethylnon-2′-enyloxy)-4-ethylbenzene,
1-(5′-hydroxy-1′,5′-dimethylhexanyloxy)-4-ethylbenzene,
1-(7′-hydroxy-3′,7′-dimethyloct-2′-enyloxy)-3-chloro-4-ethylbenzene,
1-(7′-hydroxy-3′,7′-dimethyloct-2′-enyloxy)-3,4-methylenedioxybenzene and
methyl 4-(7′-hydroxy-3′, 7′-dimethyloctanyloxy)phenyl ketone.

EXAMPLE 2

A mixture of 2 g. of dry 7-hydroxy-3,7-dimethyloctyl p-iospropylphenyl ether, 15 ml. of acetyl chloride and 20 ml. of dry pyridine under nitrogen is heated on a steam bath for about 6 hours. After cooling, the mixture is concentrated under vacuum and the residue taken up in ether. The ethereal extract is washed, dried over magnesium sulfate and evaporated to yield the corresponding acetate (7-acetoxy-3,7-dimethyloctyl p-isopropylphenyl ether).

The process of this example is repeated with the exception of using triethylamine in place of pyridine to yield 7-acetoxy-3,7-dimethyloctyl p-isopropylphenyl ether.

By use of the foregoing procedure, each of 7-hydroxy-3,7-dimethyloctyl p-ethylphenyl ether and 7-hydroxy-3,7-dimethyloct-2-enyl p-ethylphenyl ether is converted into the corresponding 7-chloroacetate, 7-dichloroacetate and 7-trichloroacetate using chloroacetyl chloride, dichloroacetyl chloride and trichloroacetyl chloride.

EXAMPLE 3

A mixture of 20 ml. of dry formic acid and 2 g. of 3,7-dimethyloct-6-enyl p-ethylphenyl ether is heated at 50° for 2 hours and then poured onto ice cold potassium bicarbonate solution. The reaction is worked up by extraction with ether, washing the ethereal extract, drying over magnesium sulfate and evaporation to yield the formate of 7-hydroxy-3,7-dimethyloctyl p-ethylphenyl ether.

Using the above process, the formates of formulas I,

II and III are prepared from the corresponding precursor having an olefinic bond in the terminal group.

EXAMPLE 4

The process of Example 1 is repeated with the exception of using as the starting material, each of:

7-hydroxy-3,7-dimethyloctyl p-nitrophenyl ether,
7-hydroxy-3,7-dimethylnonyl p-chlorophenyl ether,
7-hydroxy-3,7-dimethyloct-2-enyl p-chlorophenyl ether,
7-hydroxy-3,7-dimethyloctyl 2,3,4-trichlorophenyl ether,
7-hydroxy-3,7-dimethyloctyl 3-ethylphenyl ether,
7-hydroxy-3,7-dimethyloctyl p-t-butylphenyl ether,
7-hydroxy-3,7-dimethyloctyl p-trifluoromethylphenyl ether,
7-hydroxy-3,7-dimethyloctyl p-ethoxyphenyl ether,
8-hydroxy-3,8-dimethyldec-2-enyl p-ethylphenyl ether,
7-hydroxy-3,7-dimethyloctyl 3-ethyl-4-chlorophenyl ether,
7-hydroxy-3,7-dimethyloctyl 2-methyl-4-ethylphenyl ether,
7-hydroxy-3,7-dimethyloctyl 2-chloro-4-t-butylphenyl ether,
7-hydroxy-3,7-dimethyloctyl 2-chloro-4,5-dimethylphenyl ether,
7-hydroxy-3,7-dimethyloctyl p-allylphenyl ether,
7-hydroxy-3,7-dimethyloctyl p-(1'-propenyl)phenyl ether,
7-hydroxy-3,7-dimethyloct-2-enyl p-sec.-butylphenyl ether,
7-hydroxy-3,7-dimethyloctyl 3,4-methylenedioxyphenyl ether,
7-hydroxy-3,7-dimethyloctyl 3-chloro-4-ethylphenyl ether,
7-hydroxy-3,7-dimethyloctyl 2,4,6-trichlorophenyl ether,
7-hydroxy-3,7-dimethyloctyl 3,4-dichlorophenyl ether,
7-hydroxy-3,7-dimethyloctyl 2,4-dichlorophenyl ether,
7-hydroxy-3,7-dimethyloctyl 2,4,5-trichlorophenyl ether,
7-hydroxy-3,7-dimethyloctyl 2,3,4,6-tetrachlorophenyl ether,
7-hydroxy-3,7-dimethyloct-2-enyl 3-chloro-4-ethylphenyl ether,
7-hydroxy-3,7-dimethylnon-2-enyl 3-chloro-4-ethylphenyl ether, and
7-hydroxy-3,7-dimethyloctyl 4-cyanophenyl ether to prepare the corresponding acetate esters.

The corresponding trifluoroacetate, propionate, n-butanoate, n-pentanoate and n-hexanoate esters of the above hydroxyl compounds are prepared according to the process of Example 1 using trifluoroacetic anhydride, propionic anhydride, n-butyric anhydride, n-pentanoic anhydride and n-hexanoic anhydride or according to the process of Example 2 using the corresponding acid chloride.

What is claimed is:

1. A compound selected from those of the formulas I, II and III:

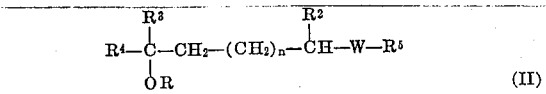
(II)

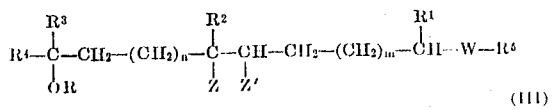
(III)

wherein,

W is oxygen atom or sulfur atom;
$m$ is the positive integer 1 or 2;
$n$ is the positive integer 2 or 3;
each of Z and Z' is hydrogen or taken together a carbon-carbon bond;
R represents carboxylic acyl of one to 18 carbon atoms;
$R^5$ is the group

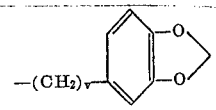

$v$ is zero or the positive integer 1; and
each of $R^1$, $R^2$, $R^3$ and $R^4$ is lower alkyl.

2. A compound according to claim 1 wherein $v$ is zero; $m$ is 1; $n$ is 2; W is oxygen atom; and each of $R^1$, $R^2$, $R^3$ and $R^4$ is methyl or ethyl.

3. A compound of formula I or II according to claim 2 wherein each of $R^2$, $R^3$ and $R^4$ is methyl or ethyl and R is an acyl group of one to six carbon atoms.

4. A compound according to claim 3 wherein R is an acyl group of two to six carbon atoms.

5. A compound of formula I to claim 3 wherein Z and Z' taken together is a carbon-carbon bond.

6. A compound of formula I according to claim 3 wherein each of Z and Z' is hydrogen.

7. A compound according to claim 5 wherein each of $R^2$, $R^3$ and $R^4$ is methyl and R is acetyl.

8. A compound according to claim 6 wherein each of $R^2$, $R^3$ and $R^4$ is methyl and R is acetyl.

* * * * *

UNITED STATES PATENT OFFICE
CERTIFICATE OF CORRECTION

Patent No. 3,709,915  Dated January 9, 1973

Inventor(s) John B. Siddall

It is certified that error appears in the above-identified patent and that said Letters Patent are hereby corrected as shown below:

Claim 1, after "those of the formulas I, II and III:" insert

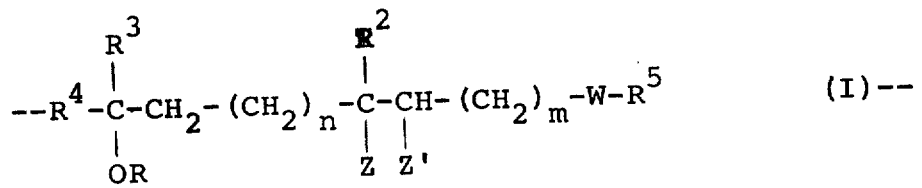

Signed and sealed this 15th day of October 1974.

(SEAL)
Attest:

McCOY M. GIBSON JR.
Attesting Officer

C. MARSHALL DANN
Commissioner of Patents